US006639786B2

(12) United States Patent
Noguchi et al.

(10) Patent No.: US 6,639,786 B2
(45) Date of Patent: Oct. 28, 2003

(54) CYLINDRICAL ELECTRIC DOUBLE-LAYER CAPACITOR

(75) Inventors: Minoru Noguchi, Wako (JP); Naohiko Oki, Wako (JP); Eisuke Komazawa, Wako (JP); Takahiro Takeshita, Wako (JP); Yasuhiro Matsumoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/191,178

(22) Filed: Jul. 9, 2002

(65) Prior Publication Data

US 2003/0043532 A1 Mar. 6, 2003

(30) Foreign Application Priority Data

Jul. 11, 2001 (JP) ........................................ 2001-211084

(51) Int. Cl.[7] .............................. H01G 9/00; H01G 9/02
(52) U.S. Cl. ........................ 361/502; 361/511; 361/512
(58) Field of Search .............................. 361/502, 512, 361/517, 518, 535, 536, 511

(56) References Cited

U.S. PATENT DOCUMENTS 6,307,735 B1 * 10/2001 Saito et al. ................. 361/517
6,433,997 B1 * 8/2002 Noguchi et al. ............ 361/511

FOREIGN PATENT DOCUMENTS

JP           2000-243670           9/2000

* cited by examiner

*Primary Examiner*—Anthony Dinkins
(74) *Attorney, Agent, or Firm*—Lahive & Cockfield, LLP (57) ABSTRACT

A cylindrical electric double-layer capacitor includes a cylindrical sealed vessel housing an electrode roll and an electrolyte solution. The electrode roll is formed of a rolled superposed assembly having band-shaped positive and negative poles and two band-shaped separators sandwiching one of the band-shaped positive and negative poles. Each of the band-shaped positive and negative poles includes a band-shaped collector and a pair of polarizing electrodes formed in a laminated manner on opposite surfaces of the band-shaped collector. In a state in which the electrode roll has been accommodated in the sealed vessel along with the electrolyte solution, an outer diameter D1 of the electrode roll and an inner diameter D2 of the sealed vessel are brought into a relationship of D1=D2 by at least one of swelling of the polarizing electrodes caused by the electrolyte solution and expansion of the polarizing electrodes caused by an electrical charge. Thus, in the cylindrical electric double-layer capacitor, it is possible to avoid an increase in internal resistance, a reduction in a self-discharging characteristic and other like electrical characteristics.

7 Claims, 7 Drawing Sheets

CYLINDRICAL ELECTRIC DOUBLE-LAYER CAPACITOR

BACKGROUND OF THE INVENTION

1. Field of the Invention

The present invention relates to a cylindrical electric double-layer capacitor, and particularly to a cylindrical electric double-layer capacitor having a cylindrical sealed vessel that seals an electrode roll and an electrolyte solution. The electrode roll being made by swirlingly rolling a superposed assembly comprising a band-shaped positive pole, a band-shaped negative pole and two band-shaped separators sandwiching one of the band-shaped positive and negative poles. Each of the band-shaped positive and negative poles has a band-shaped collector and a pair of polarizing electrodes formed in a laminated manner on opposite surfaces of the band-shaped collector.

2. Description of the Related Art

If a gap exists between an inner peripheral surface of the sealed vessel and an outer peripheral surface of the electrode roll, when a vibration or a shock acts on the electric double-layer capacitor, the electrode roll is vibrated, whereby the polarizing electrodes may be peeled off from the collector. Such a situation causes an increase in internal resistance, a reduction in a self-discharging characteristic and other like effects.

In a conventional measure, a plurality of annular projections are formed by drawing on an inner peripheral surface of a metal vessel, so that they are arranged at predetermined intervals in the axial direction, and tops of the annular projections abut against an outer peripheral surface of an electrode roll (see Japanese Patent Application Laid-open No. 2000-243670).

With the above construction, however, when rubbing due to vibration or the like occurs between the outer peripheral surface of the electrode roll and each of the annular projections, the following disadvantages often occur: if the outer peripheral surface of the electrode roll is defined by a separator, the separator may be broken, and if the outer peripheral surface of the electrode roll is defined by the polarizing electrode, the electrode may be peeled off from the collector.

SUMMARY OF THE INVENTION

Accordingly, it is an object of the present invention to provide a cylindrical electric double-layer capacitor which can eliminate the above-mentioned disadvantages by applying a contrivance to the electrode roll.

To achieve the above object, according to the present invention, there is provided a cylindrical electric double-layer capacitor comprising a cylindrical sealed vessel housing an electrode roll and an electrolyte solution. The electrode roll is formed of a superposed assembly comprising a band-shaped positive pole, a band-shaped negative pole and two band-shaped separators sandwiching one of the band-shaped positive and negative poles. Each of the band-shaped positive and negative poles has a band-shaped collector and a pair of polarizing electrodes formed in a laminated manner on opposite surfaces of the band-shaped collector. An outer diameter D1 of the electrode roll before being accommodated in the sealed vessel and an inner diameter D2 of the sealed vessel are in a relationship of D1<D2. In a state in which the electrode roll has been accommodated in the sealed vessel along with the electrolyte solution, the outer diameter D1 of the electrode roll and the inner diameter D2 of the sealed vessel are brought into a relationship of D1=D2 by at least one of swelling of the polarizing electrodes caused by the electrolyte solution and expansion of the polarizing electrodes caused by electrical charge.

In the capacitor, when the electrode roll is accommodated in the sealed vessel along with the electrolyte solution, the electrode roll can be naturally adhered to the sealed vessel after the accommodation or during electrical charge. Thus, even in a situation where the polarizing electrode would possibly be peeled off from the band-shaped collector due to a difference in elongation between the band-shaped collector and the polarizing electrode, the polarizing electrode can be always adhered to the band-shaped collector to avoid an increase in internal resistance, a reduction in a self-discharging characteristic and other like electrical effects. In addition, it is unnecessary to subject the vessel to a drawing process, so that an equipment for drawing is not required.

According to a second feature of the present invention, the polarizing electrode includes a conductive filler having a high hydrophilicity.

According to a third feature of the present invention, the polarizing electrode includes activated carbon which is made by subjecting a source material for easily-graphitable carbon to a carbonizing treatment and an activating treatment and which is expanded during electrical charge.

With the second and third features, the cylindrical electric double-layer capacitor can be formed easily and reliably.

According to a fourth feature of the present invention, the band-shaped collector is formed of a metal foil, and an elongation δ of the metal foil in the electrode roll is equal to or higher than 4% when the metal foil is broken.

With the fourth feature, in the cylindrical electric double-layer capacitor, it is possible to reliably avoid a damage due to the elongation of the band-shaped collector formed of the metal foil.

The above and other objects, features and advantages of the invention will become apparent from the following description of the preferred embodiment taken in conjunction with the accompanying drawings.

DESCRIPTION OF A PREFERRED EMBODIMENT

The present invention will now be described by way of an embodiment with reference to the accompanying drawings.

Figure 1:
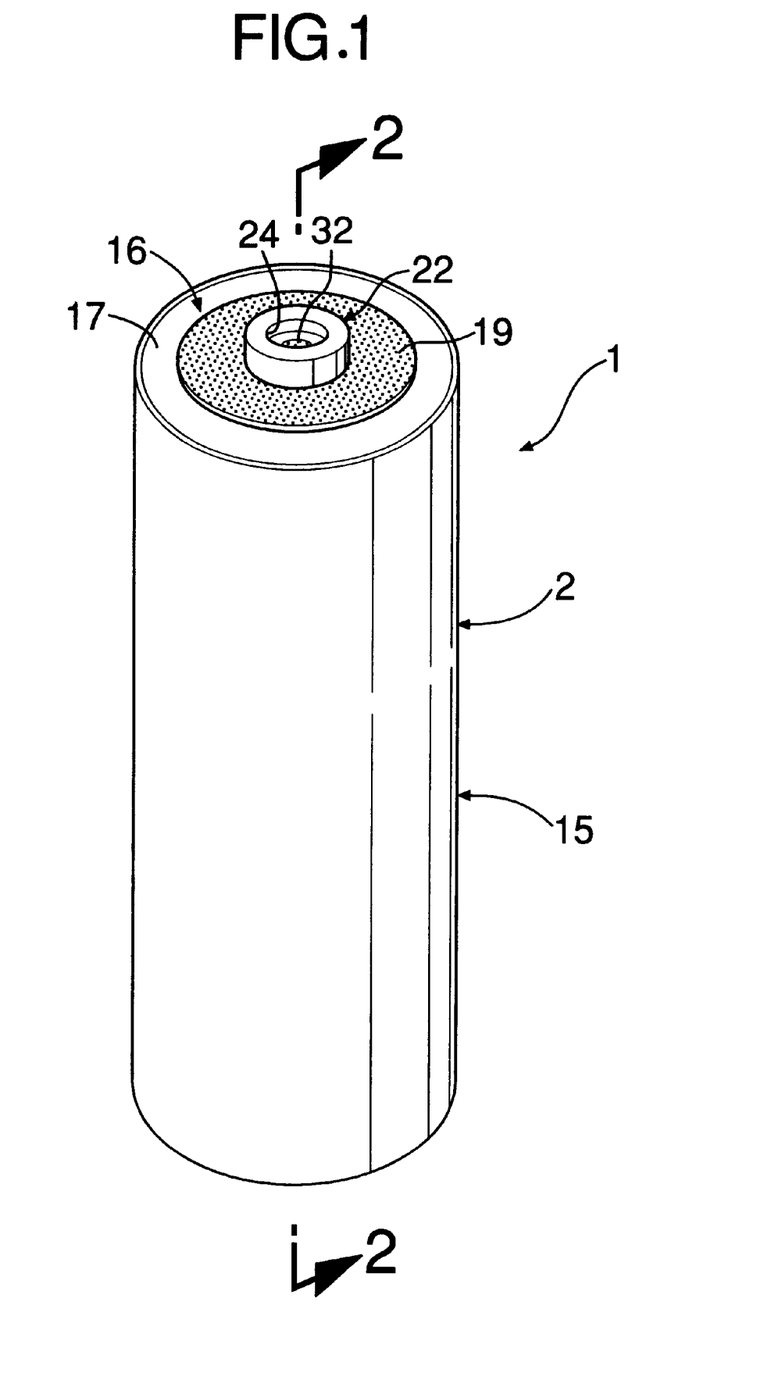
FIG. 1 is a perspective view of a cylindrical electric double-layer capacitor according to the present invention.
Figure 2:
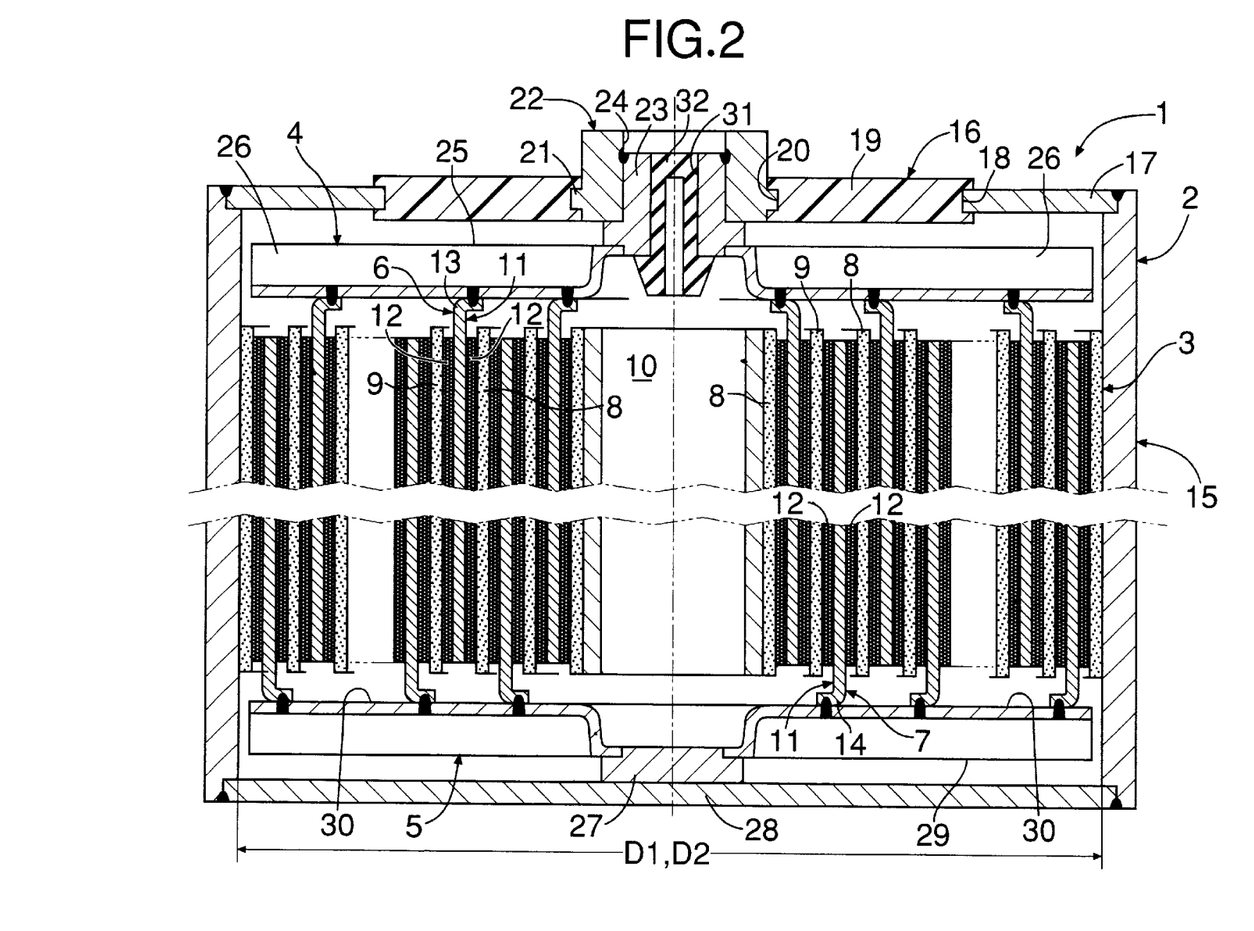
FIG. 2 is an enlarged sectional view taken along a line 2—2 in FIG. 1.

Referring to FIGS. 1 and 2, a cylindrical electric double-layer capacitor 1 includes a cylindrical sealed vessel 2 which accommodates an electrode roll 3, two disk-shaped collectors 4 and 5 and an electrolyte solution.

Figure 3:
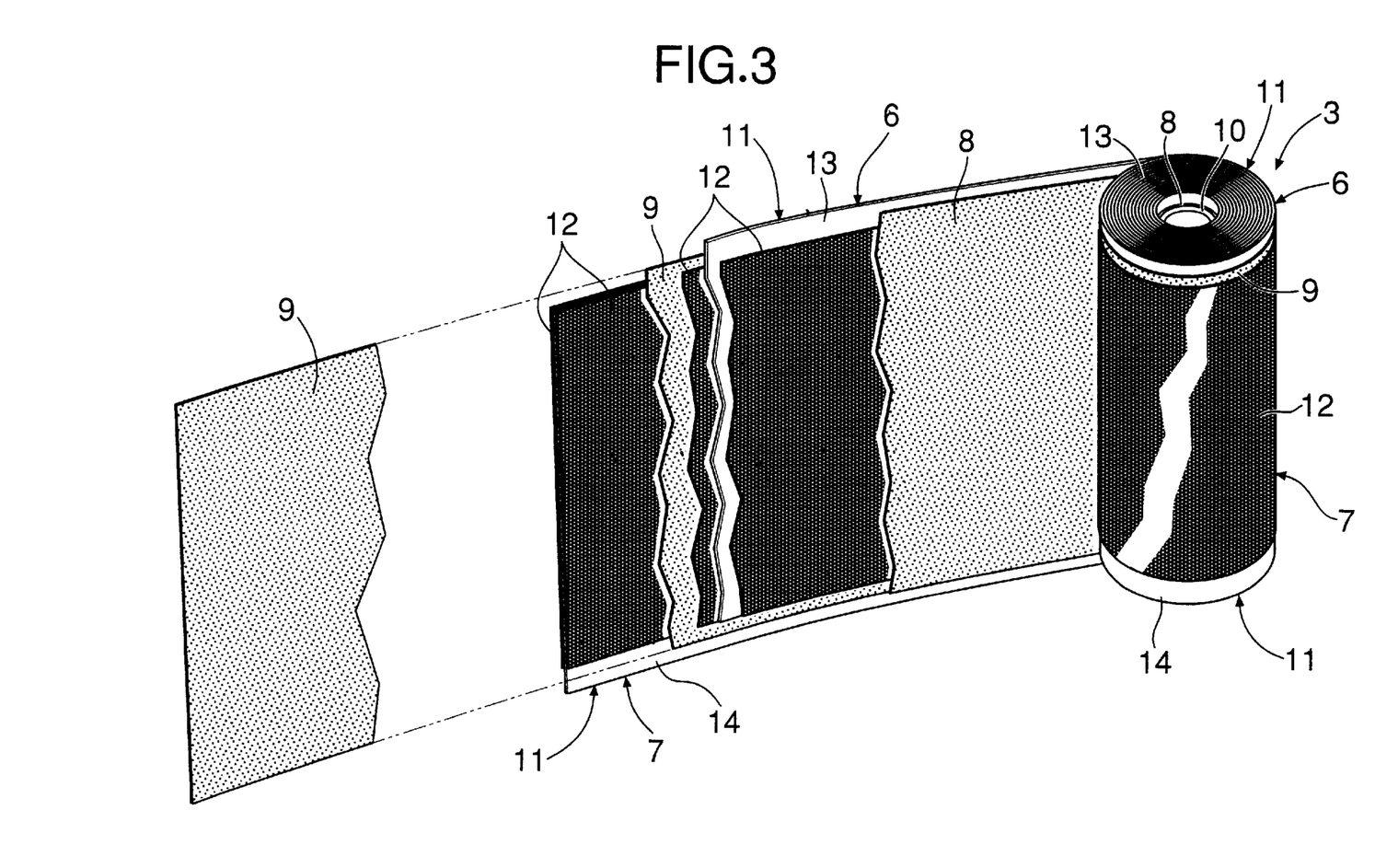
FIG. 3 is a broken perspective view for explaining the structure of an electrode roll.

As shown in FIG. 3, the electrode roll 3 is formed by wrapping an aluminum core 10, with a superposed assembly comprising a band-shaped positive pole 6, a band-shaped negative pole 7 and two band-shaped separators 8 and 9 sandwiching one of the band-shaped positive pole 6 and the band-shaped negative pole 7 so that the band-shaped separator 8 lying inside the band-shaped positive pole 6 is located on an innermost side. FIG. 3 illustrates the sandwiching of the band-shaped positive pole 6. In this case, the other band-shaped separator 9 located between the band-shaped positive and negative poles 6 and 7 extends from the terminal end of the band-shaped negative pole 7 by a length corresponding to one turn to cover the outermost periphery of the band-shaped negative pole 7.

Figure 4:
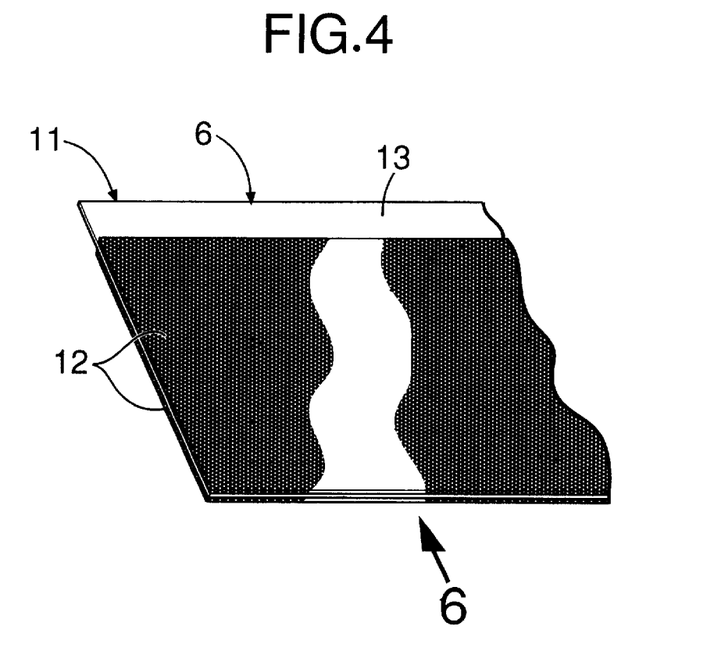
FIG. 4 is a perspective view of a band-shaped positive pole.
Figure 5:
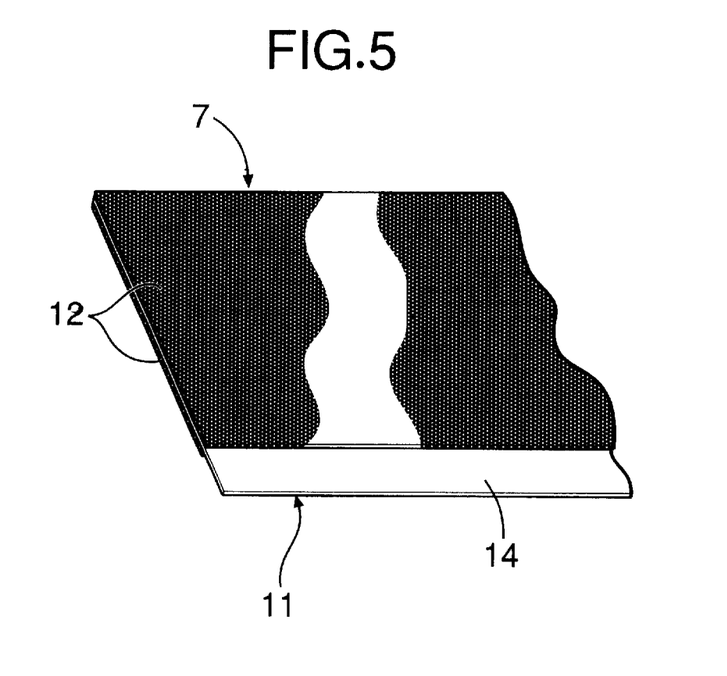
FIG. 5 is a perspective view of a band-shaped negative pole.
Figure 6:
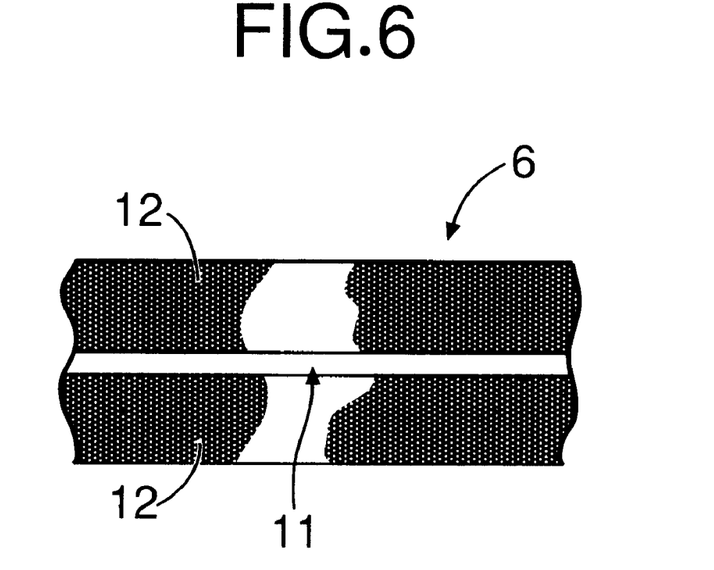
FIG. 6 is a partial enlarged view taken in a direction of an arrow 6 in FIG. 4.

As shown in FIGS. 4 to 6, each of the band-shaped positive and negative poles 6 and 7 includes a band-shaped collector 11 and a pair of polarizing electrode 12 formed in a laminated manner on opposite sides of the band-shaped collector 11. In the band-shaped positive pole 6, a lengthwise one side edge on opposite surfaces of the collector 11 is an area where the electrode is not present and functions as a connection 13 with a positive polar terminal. The band-shaped positive pole 6 and the band-shaped negative pole 7 have the same construction, however, they are disposed in such a manner that in the band-shaped positive pole 6 the separator 8 protrudes from the polarizing electrode 12 and the connection 13 protrudes from the separator 8 on one axial side of the electrode roll 3, whereas in the band-shaped negative pole 7 the separator 9 protrudes from the polarizing electrode 12 and the connection 14 protrudes from the separator 9 on the other axial side of the electrode roll 3. The lengthwise other side edge on opposite surfaces of the collector 11 of the band-shaped negative pole 7 is an area where the electrode is not present and functions as a connection 14 with a negative polar terminal.

As shown in FIGS. 1 and 2, the sealed vessel 2 comprises a bottomed cylindrical body 15 made of aluminum, and a lid 16, which closes an opening in the body 15. The lid 16 includes an annular outer peripheral plate 17 made of aluminum and welded to the body 15, and an annular intermediate plate 19 made of an electrically insulating synthetic resin with its outer peripheral groove 18 fitted over an inner peripheral edge of the outer peripheral plate 17. The lid 16 further includes a cylindrical positive polar terminal 22 made of an aluminum alloy with its outer peripheral projection 21 fitted into an inner peripheral groove 20 in the intermediate plate 19.

Figure 7:
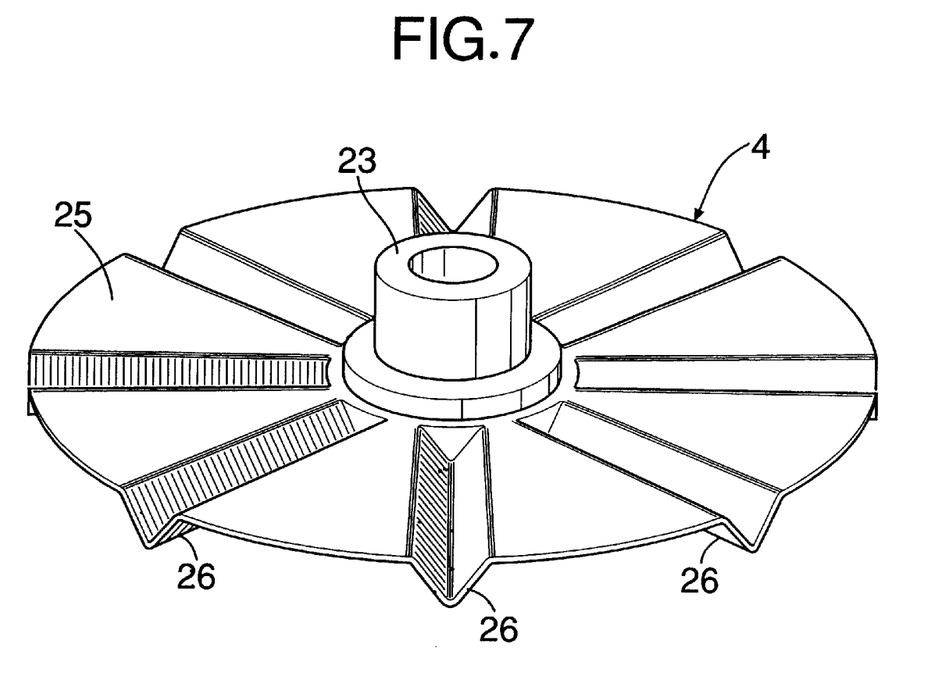
FIG. 7 is a perspective view of a disk-shaped collector adjacent the positive pole, taken from above.

As shown in FIG. 7, in the disk-shaped collector 4 made of an aluminum alloy, a boss 23 provided at the center of the collector 4 is fitted into a center bore 24 in the cylindrical positive polar terminal 22 and welded to the latter. A disk portion 25 has a plurality of V-shaped recesses 26 arranged radially and protruding downwards, and the connection 13 of the band-shaped positive pole 6 is welded in angled bottoms of the recesses 26.

Figure 8:
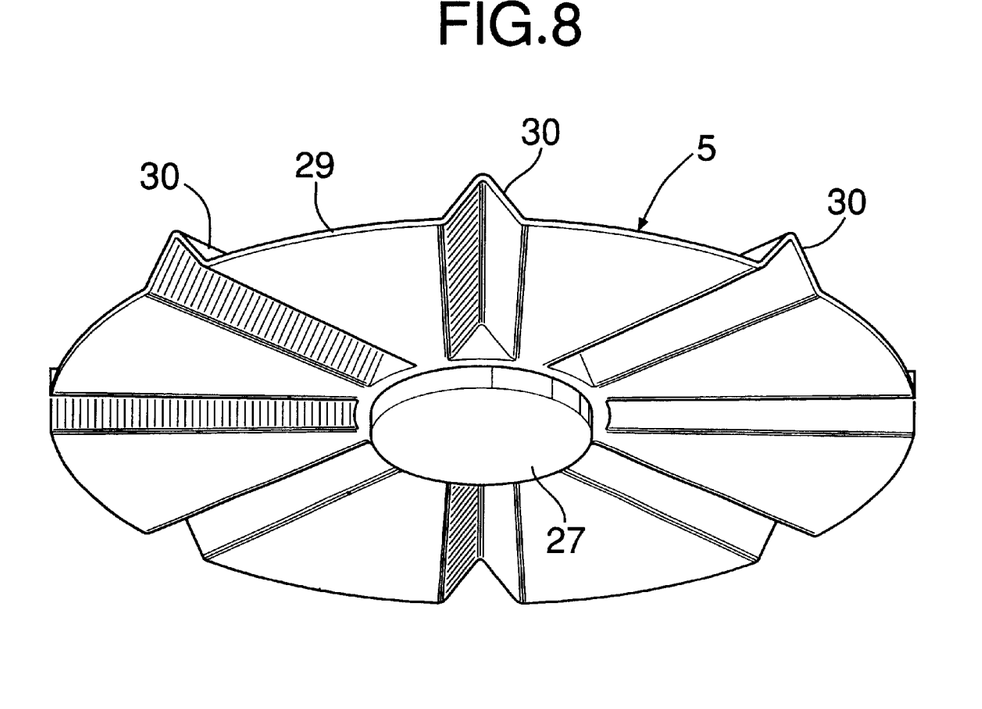
FIG. 8 is a perspective view of a disk-shaped collector adjacent the negative pole, taken from above.

As shown in FIG. 8, in the other disk-shaped collector 5 made of an aluminum alloy, a boss 27 provided at the center of the collector 5 is welded to a bottom wall of the bottomed cylindrical body 15 which is a negative polar terminal 28. A disk portion 29 has a plurality of chevron-shaped projections 30 arranged radially and protruding upwards, and the connection 14 of the band-shaped negative pole 7 is welded to ridges of the projections 30.

The electrolyte is injected into the sealed vessel 2 through an injecting bore 31 defined in the boss 23 of the disk-shaped collector 4 adjacent the positive pole, and the injecting bore 31 is then closed by a rubber plug 32.

Each of the polarizing electrodes 12 comprises activated carbon, conductive filler and binder. The electrolyte which may be used is a solution of a quaternary ammonium borofluoride compound, e.g., $TEMA.BF_4[(C_2H_5)_3 CH_3N.BF_4$ (ethylmethyl ammonium borofluoride as a solute) in PC (propylene carbonate as a solvent).

An outer diameter D1 of the electrode roll 3 before being accommodated in the sealed vessel 2 and an inner diameter D2 of the bottomed cylindrical body 15 are in a relationship of D1<D2, so that the electrode roll 3 can be easily inserted into the bottomed cylindrical body 15. On the other hand, in a state in which the electrode roll 3 has been inserted into the sealed vessel 2 along with the electrolyte solution, the outer diameter D1 of the electrode roll 3 and the inner diameter D2 of the bottomed cylindrical body 15 are brought into a relationship of D1=D2 by at least one of the swelling of each polarizing electrode 12 by the electrolyte solution and the expansion of each polarizing electrode 12 by electrical charge. To cause the swelling, for example, a conductive filler having a high hydrophilicity, e.g., Ketjen Black EC (a trade name of Mitsubishi Chemicals) may be incorporated in the polarizing electrode 12. On the other hand, to cause the expansion, for example, activated carbon, which is produced by subjecting a source material for easily-graphitable carbon to a carbonizing treatment and an activating treatment and which is expanded upon electrical charge, may be incorporated in the polarizing electrode 12. Examples of the source material for easily-graphitable carbon are mesophase pitch, petroleum pitch, coal pitch, PVC (polyvinyl chloride) pitch, mesocarbon micro-beads, PAN (polyacrylonitrile), polyimide and the like.

In this capacitor 1, when the electrode roll 3 is accommodated in the sealed vessel 2 along with the electrolyte solution, the electrode roll 3 can be naturally adhered to the sealed vessel 2 after the accommodation or during electrical charge. Thus, even in a situation where the polarizing electrode 12 would possibly be peeled off from the band-shaped collector 11 due to a difference in elongation between the band-shaped collector 11 and the polarizing electrode 12, the polarizing electrode 12 can be adhered to the band-shaped collector 11 to avoid an increase in internal resistance, a reduction in a self-discharging characteristic and other like undesirable electrical characteristics.

Each of the band-shaped collectors 11 is made of a metal foil (an aluminum foil in the illustrative embodiment) and an elongation δ of the aluminum foil upon its breaking is set at a value equal to or higher than about 4%. Thus, in the swelling and/or the expansion, generation of cracks in the aluminum foil can be reliably avoided.

A non-woven fabric of PBT (polybutylene terephthalate) is used for the band-shaped separators 8 and 9 in consideration of load resistance, elongation and heat resistance. PTFE is used as the binder.

A. Production of Cylindrical Electric Double-layer Capacitor

EXAMPLE ONE (a) about 80% by weight of steam-activated carbon made by using a phenol resin as a source material, about 10% by weight of Ketjen Black EC, and about 10% by weight of Teflon 6J (a trade name of Mitsui Du Pont Fluorochemicals) were kneaded together. Then, the kneaded material was subjected to rolling, to obtain an electrode sheet having a thickness of about 150 μm. A plurality of band-shaped polarizing electrodes 12 each having a width of about 103 mm and a length of about 1,400 mm were cut off from the electrode sheet. Then, the two polarizing electrodes 12 and a band-shaped collector 11 made of an aluminum foil having a width of about 109 mm, a length of about 1,400 mm and a thickness of about 30 μm were press-bonded to each other under a linear pressure of about 6 t by using a pair of pressing rollers, to fabricate a band-shaped positive pole 6. A band-shaped negative pole 7 was also fabricated in the same manner.

(b) Each of polarizing electrodes 12 of the band-shaped positive and negative poles 6 and 7 was impregnated with an electrolyte solution made by dissolving about 1.8 moles of $TEMA.BF_4$ in a PC solution, and a degree of swelling of each polarizing electrode 12 in a thickness-wise direction was examined, to find that the degree of swelling was about 10%. An elongation δ of the aluminum foil as the band-shaped collector 11 upon its breaking was also examined, to find that the elongation δ was decreased to equal to or lower than about 1% due to the cure caused by the press-bonding. Therefore, each of the band-shaped positive and negative poles 6 and 7 was subjected to a thermal treatment heating at about 250° C. for about 2 hours, whereby the elongation δ of the aluminum foil upon its breaking was restored to a value equal to or higher than about 4%.

(c) A superposed assembly comprising of the band-shaped positive pole 6, the band-shaped negative pole 7 and band-shaped separators 8 and 9 sandwiching the band-shaped positive pole 6, was wrapped around the aluminum core 10, so that one of the band-shaped separators 8 lying outside the band-shaped positive pole 6 was located on the innermost side, thereby producing an electrode roll 3 having an outer diameter D1 of about 38.5 mm and a length of about 115 mm.

(d) The electrode roll 3 was placed into a bottomed cylindrical body 15 having an inner diameter D2 of about 39.5 mm and a length of about 120 mm, and the electrolyte solution was then injected into the body 15. In this state, the electrode roll 3 was observed to confirm that each of the polarizing electrodes 12 swelled, whereby an outer peripheral surface of the electrode roll 3 was brought into close contact with an inner peripheral surface of the bottomed cylindrical body 15. This swelling caused an elongation of about 2.6% in the aluminum foil of the band-shaped negative pole 7 on the outermost periphery. No crack was generated in the aluminum foil, because the elongation δ of the aluminum foil upon its breaking was set at the value equal to or higher than about 4%. On the other hand, if the thermal treatment was not conducted, cracks were generated in the electrode roll to extend radially inwards from the outer peripheral surface thereof, with a length of about one third of the radius of the electrode roll 3.

(e) To produce the capacitor 1, the disk-shaped collectors 4 and 5 were connected to the electrode roll 5, and they were incorporated into a sealed vessel 2. Then, an electrolyte solution made by dissolving about 1.8 moles of $TEMA.BF_4$ in a PC solution was injected into the sealed vessel 2 through an injecting bore 31 in a positive polar terminal 22, and thereafter the injecting bore 31 was closed by a rubber plug 32. A cylindrical electric double-layer capacitor 1 produced in the above manner is called Example (1).

EXAMPLE TWO

The cylindrical electric double-layer capacitor 1 was produced in the same manner as in Example (1), except that activated carbon which is made by subjecting mesophase pitch to a carbonizing treatment and an activating treatment and which is swelled upon electrical charge, was used in place of the activated carbon used in Example (1). This cylindrical electric double-layer capacitor 1 is called Example (2). In this case, an expansion rate of each polarizing electrode 12 during electrical charge was about 40% at a charging voltage of about 2.7 V.

B. Performance of Examples (1) and (2)

An internal resistance of each of Examples (1) and (2) was measured, showing that the internal resistance was about 3 mΩ. To examine a self-discharging characteristic, each of Examples (1) and (2) was electrically charged at about 7 V for about 24 hours and then left to stand at room temperature for about 27 hours with its terminal opened, and thereafter a voltage was measured. As a result, the voltage was about 2.538 V, and a voltage-maintaining rate was about 94%. Then, each of Examples (1) and (2) was placed on a vibrational testing machine, where a vibrational force was applied thereto for about 10 hours under the conditions of about 2.2 G, 10 to 200 Hz and a sweep of about 10 g. Thereafter, an internal resistance of each of Examples (1) and (2) was measured again, and a self-discharging characteristic was examined. As a result, it was found that almost no difference in internal resistance as well as self-discharging characteristic was presented between before and after the application of the vibrational force. In addition, no damage was observed in the aluminum foil.

It should be noted that the electrode roll 3 can be brought into close contact with the sealed vessel 2 only by utilizing the swelling of the polarizing electrodes 12 provided by the electrical charge, without utilizing the swelling thereof provided by the impregnation of the polarizing electrode 12 with the electrolyte solution.

Although the embodiment of the present invention has been described in detail, it will be understood that the present invention is not limited to the above-described embodiment, and various modifications in design may be made without departing from the spirit and scope of the invention as defined in the claims.

What is claimed is:

1. A cylindrical electric double-layer capacitor comprising a cylindrical sealed vessel housing an electrode roll and an electrolyte solution, the electrode roll comprising a wrapped superposed assembly having a band-shaped positive pole, a band-shaped negative pole, and two band-shaped separators sandwiching one of the band-shaped positive and negative poles, wherein each of the band-shaped positive and negative poles includes a band-shaped collector and a pair of polarizing electrodes formed on opposite surfaces of the band-shaped collector, wherein an outer diameter D1 of the electrode roll before being housed in the sealed vessel and an inner diameter D2 of the sealed vessel are in a relationship of D1<D2, and wherein, when the electrode roll is housed in the sealed vessel along with the electrolyte solution, the outer diameter D1 of the electrode roll and the inner diameter D2 of the sealed vessel are brought into a relationship of D1=D2 by at least one of swelling of the polarizing electrodes caused by the electrolyte solution and expansion of the polarizing electrodes caused by an electrical charge.

2. A cylindrical electric double-layer capacitor according to claim 1, wherein the polarizing electrode comprises a conductive filler having a high hydrophilicity.

3. A cylindrical electric double-layer capacitor according to claim 1, wherein the polarizing electrode comprises activated carbon which is made by subjecting a source material to a carbonizing treatment and an activating treatment and which is expanded during the electrical charge.

4. A cylindrical electric double-layer capacitor according to claim 1, wherein the band-shaped collector is formed of a metal foil, and wherein an elongation δ of the metal foil in the electrode roll is equal to or higher than about 4% when the metal foil is broken.

5. A cylindrical electric double-layer capacitor according to claim 2, wherein the polarizing electrode comprises activated carbon which is made by subjecting a source material to a carbonizing treatment and an activating treatment and which is expanded during the electrical charge.

6. A cylindrical electric double-layer capacitor according to claim 2, wherein the band-shaped collector is formed of a metal foil, and wherein an elongation δ of the metal foil in the electrode roll is equal to or higher than about 4% when the metal foil is broken.

7. A cylindrical electric double-layer capacitor according to claim 3, wherein the band-shaped collector is formed of a metal foil, and wherein an elongation δ of the metal foil in the electrode roll is equal to or higher than about 4% when the metal foil is broken.

* * * * *